US009213225B2

(12) United States Patent
Lin

(10) Patent No.: US 9,213,225 B2
(45) Date of Patent: Dec. 15, 2015

(54) POLARIZATION CONVERTER FOR USE IN A PROJECTOR APPARATUS AND PROJECTOR APPARATUS COMPRISING THE POLARIZATION CONVERTER

(75) Inventor: Hung Ying Lin, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 249 days.

(21) Appl. No.: 13/477,577

(22) Filed: May 22, 2012

(65) Prior Publication Data

US 2013/0215338 A1    Aug. 22, 2013

(30) Foreign Application Priority Data

Feb. 22, 2012  (TW) .............................. 101105712 A

(51) Int. Cl.
*G02B 27/26* (2006.01)
*G03B 21/20* (2006.01)
*G02B 27/28* (2006.01)
*G02B 5/30* (2006.01)
*H04N 13/04* (2006.01)

(52) U.S. Cl.
CPC .......... *G03B 21/2073* (2013.01); *G02B 5/3083* (2013.01); *G02B 27/26* (2013.01); *G02B 27/283* (2013.01); *G02B 27/285* (2013.01); *G03B 21/208* (2013.01); *H04N 13/04* (2013.01); *H04N 13/0434* (2013.01)

(58) Field of Classification Search
CPC ... G02B 27/26; H04N 13/04; H04N 13/0434; G03B 21/208; G03B 21/2073; G03B 27/283; G03B 27/285
USPC .......... 353/7, 8; 348/51, 52, 53, 54, 55, 56, 60
See application file for complete search history.

(56) References Cited

U.S. PATENT DOCUMENTS

| 5,283,600 A * | 2/1994 | Imai ..................... G02B 27/283 348/E9.027 |
| 6,042,237 A * | 3/2000 | De Vaan et al. ................. 353/38 |

(Continued)

FOREIGN PATENT DOCUMENTS

| CN | 2465207 Y | 12/2001 |
| CN | 101329038 | 12/2008 |

(Continued)

OTHER PUBLICATIONS

Office Action dated May 6, 2014 from corresponding application No. TW 101105712. Summary of the Office Action in English is included.

*Primary Examiner* — Bao-Luan Le
(74) *Attorney, Agent, or Firm* — Hauptman Ham, LLP

(57) ABSTRACT

A polarization converter for use in a projector apparatus is provided. The polarization converter includes a polarizing beam splitter, a half wavelength retarder and a quarter wavelength retarder. The polarizing beam splitter could split a first light into a first light beam with a first polarized direction and a second light beam with a second polarized direction. The half wavelength retarder is disposed on the side of the polarizing beam splitter and the second light beam is converted into the second light beam with the first polarized direction by the half wavelength retarder. The first and second light beams with the first polarized direction are coupled to form a first polarized light with the first polarized direction. The quarter wavelength retarder is disposed behind the half wavelength retarder so that the first polarized light is converted into a first circularly polarized light.

14 Claims, 4 Drawing Sheets

(56) References Cited

U.S. PATENT DOCUMENTS

| | | | |
|---|---|---|---|
| 6,089,718 A * | 7/2000 | Hashizume | 353/31 |
| 6,092,901 A * | 7/2000 | Hashizume | G02B 27/283 348/E9.027 |
| 6,147,802 A * | 11/2000 | Itoh | G02B 27/28 348/E9.027 |
| 6,152,566 A * | 11/2000 | Hashizume | H04N 9/3105 348/E9.027 |
| 6,310,723 B1 * | 10/2001 | Itoh | G02B 27/28 348/E9.027 |
| 6,344,927 B1 * | 2/2002 | Itoh | G02B 27/28 348/E9.027 |
| 6,411,438 B1 * | 6/2002 | Itoh | G02B 27/28 348/E9.027 |
| 6,445,500 B1 * | 9/2002 | Itoh | G02B 27/28 348/E9.027 |
| 6,582,081 B2 * | 6/2003 | Seo et al. | 353/20 |
| 6,667,834 B2 * | 12/2003 | Itoh | G02B 27/28 348/E9.027 |
| 7,119,957 B2 * | 10/2006 | Itoh | G02B 27/28 348/E9.027 |
| 7,686,455 B2 | 3/2010 | Yoshimura et al. | |
| 7,995,153 B2 | 8/2011 | Chang | |
| 8,142,022 B2 * | 3/2012 | Maeda | G02B 27/285 349/9 |
| 8,451,390 B2 * | 5/2013 | Furukawa | G02B 27/26 349/15 |
| 8,770,760 B2 * | 7/2014 | Sawai | G02B 27/285 348/771 |
| 2002/0008910 A1 * | 1/2002 | Akiyama | G02F 1/133526 359/487.04 |
| 2002/0093737 A1 * | 7/2002 | Itoh | G02B 27/28 359/485.02 |
| 2002/0141058 A1 * | 10/2002 | Itoh | G02B 27/28 359/485.06 |
| 2005/0083573 A1 * | 4/2005 | Itoh | G02B 27/28 359/485.06 |
| 2005/0146691 A1 * | 7/2005 | Yano | 353/99 |
| 2006/0146296 A1 * | 7/2006 | Lin | 353/94 |
| 2007/0024974 A1 * | 2/2007 | Itoh | G02B 27/28 359/487.04 |
| 2008/0218697 A1 * | 9/2008 | Itoh | G02B 27/28 353/20 |
| 2009/0128780 A1 | 5/2009 | Schuck et al. | |
| 2009/0296047 A1 * | 12/2009 | Maeda | G02B 27/285 353/20 |
| 2010/0171890 A1 * | 7/2010 | Furukawa | G02B 27/26 349/9 |
| 2011/0164221 A1 * | 7/2011 | Tilleman et al. | 353/20 |
| 2012/0170001 A1 * | 7/2012 | Sawai | G02B 27/285 353/20 |
| 2013/0021581 A1 * | 1/2013 | Takahashi et al. | 353/31 |
| 2013/0169936 A1 * | 7/2013 | Kurashige et al. | 353/20 |
| 2013/0188148 A1 * | 7/2013 | DeCusatis | 353/8 |

FOREIGN PATENT DOCUMENTS

| | | |
|---|---|---|
| CN | 101986204 | 3/2011 |
| CN | 102314022 | 1/2012 |
| EP | 1 904 892 | 12/2010 |
| TW | 201202748 | 1/2012 |

* cited by examiner

POLARIZATION CONVERTER FOR USE IN A PROJECTOR APPARATUS AND PROJECTOR APPARATUS COMPRISING THE POLARIZATION CONVERTER

This application claims priority to Taiwan Patent Application No. 101105712 filed on Feb. 22, 2012.

CROSS-REFERENCES TO RELATED APPLICATIONS

Not applicable.

BACKGROUND OF THE INVENTION

1. Field of the Invention

The present invention provides a polarization converter and a projector apparatus comprising the same. More particularly, the present invention provides a polarization converter and a projector apparatus capable of improving the optical efficiency and with a low cost.

2. Descriptions of the Related Art

Solid-state light sources, such as light emitting diodes (LEDs) or laser diodes (LDs), have a long service life, a small volume and are free of mercury. However, when the solid-state light sources are used as light sources in projector apparatuses, the brightness provided by the solid-state light sources is still considerably lower than that provided by conventional high-pressure mercury lamps. Therefore, despite the widespread use of solid-state light sources, they have not yet completely replaced conventional high-pressure mercury lamps in the field of projector apparatuses.

Furthermore, because projection systems adopting high-pressure mercury lamps generally emit light rays of ultraviolet (UV) wavelengths that may impair the viewers' vision, a UV light filter must be additionally disposed at an extra cost in the projection systems to filter the UV light rays that are harmful to human eyes. For this reason, high-pressure mercury lamps have been replaced by LEDs or LDs in most of the current projection systems to miniaturize the projection systems.

On the other hand, projection systems adopting digital light processing (DLP) technologies have become the mainstream products in the projector market due to their advantages such as high brightness, realistic colors, fast response and light weight. Nowadays, applications of DLP projection systems have gradually extended to the field of stereoscopic displaying projections. Generally, to perform beam splitting on a stereoscopic image in a single projector, a conventional DLP projection system often uses a rotary optical filtering wheel that rotates synchronously with a color wheel to provide split images of different wavelength regions to the left eye and the right eye respectively so that a left image is received by the left eye and a right image is received by the right eye to generate a stereoscopic image. However, it is difficult for the rotary optical filtering wheel of the conventional stereoscopic imaging technologies to rotate in optimal synchronism with the color filter no matter the rotational speed or the rotation angle.

Furthermore, most stereoscopic displaying projection systems adopting DLP technologies must be used in combination with a pair of active glasses that is relatively expensive, which makes it difficult to lower the overall cost of such stereoscopic displaying projection systems. Moreover, the left and right shutter switching technology adopted in active glasses that is currently available has a drawback in that it may decrease the brightness of the left-eye and the right-eye view-angle images during operation.

Furthermore, in conventional stereoscopic displaying technologies (e.g., that utilize polarized light with an S polarized direction or a P polarized direction), it is likely that the user who wears such a pair of glasses sees two images at the same time due to an incomplete sheltering of the left-eye and the right-eye images when the user's head tilts (e.g., the angle of lenses of the glasses is inconsistent with a preset direction of the optical system). This causes an image cross-talk problem from which the stereoscopic displaying technologies have suffered for a long period of time.

Accordingly, an urgent need exists in the art to solve the aforesaid problems and drawbacks by designing a stereoscopic projection system that can be used with a pair of passive glasses and that has a low cost, a simplified optical arrangement, a miniaturized volume and an improved optical efficiency (e.g., an improved brightness).

SUMMARY OF THE INVENTION

An objective of the present invention is to provide a polarization converter and a projector apparatus capable of improving the optical efficiency and having a low cost.

To achieve the aforesaid objective, the present invention provides a polarization converter for use in a projector apparatus. The polarization converter comprises a polarizing beam splitter, a half wavelength retarder and a quarter wavelength retarder. The polarizing beam splitter splits a first light into a first light beam having a first polarized direction and a second light beam having a second polarized direction. The half wavelength retarder is disposed on a side of the polarizing beam splitter for receiving the first light beam and the second light beam, the second light beam is converted into the second light beam having the first polarized direction by the half wavelength retarder, and the first light beam and the second light beam having the first polarized direction are coupled to form a first polarized light having the first polarized direction. The quarter wavelength retarder is disposed behind the half wavelength retarder for receiving the first polarized light and converting the first polarized light into a first circularly polarized light.

To achieve the aforesaid objective, the present invention further provides a projector apparatus. The projector apparatus comprises the following: a light module for providing a first light in a first period and providing a second light in a second period; a light uniformizing component for uniformizing the first light and the second light; a polarization converter as described above for receiving the uniformized first light and the uniformized second light, and respectively converting the first light and the second light into the first circularly polarized light and the second circularly polarized light; and an optical modulator for receiving the first circularly polarized light and the second circularly polarized light, and transforming the first circularly polarized light into a first view-angle image in the first period and transforming the second circularly polarized light into a second view-angle image in the second period.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention provides a polarization converter and a projector apparatus comprising the same. It shall be appreciated that these embodiments are not intended to limit the present invention to any specific environment, applications or particular implementations described in these embodiments. Furthermore, it shall be firstly appreciated herein that the attached drawings are depicted in a slightly simplified or exaggerative way for ease of understanding, and the number of, shapes of and dimensional relationships among elements shown in the attached drawings are not necessarily the same as those in actual implementations and are not intended to limit the present invention.

Figure 1A:
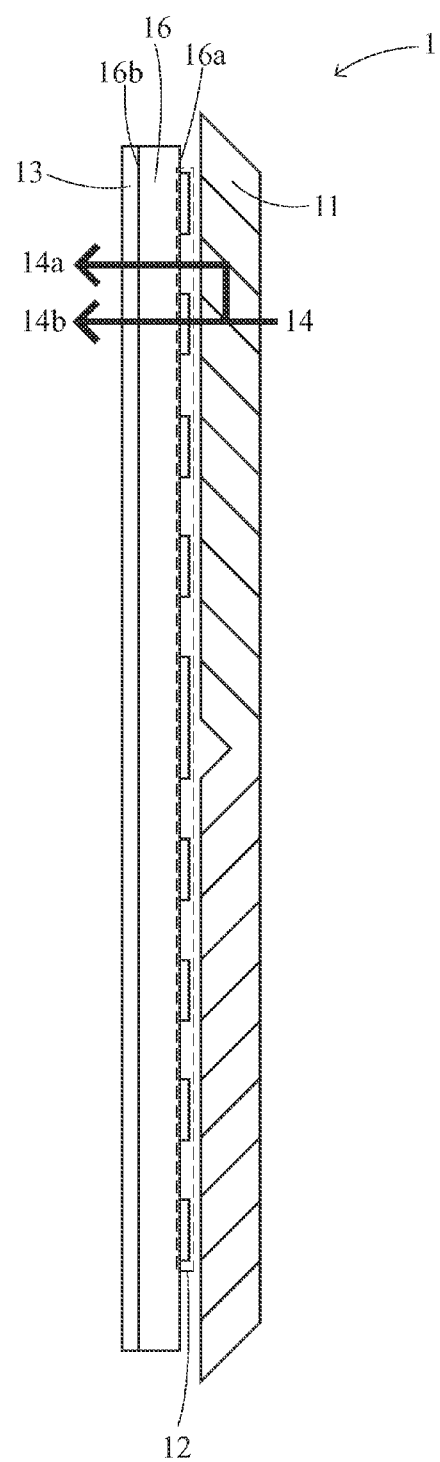
FIG. 1A is a schematic view of a polarization converter according to the first embodiment of the present invention in the first period.
Figure 1B:
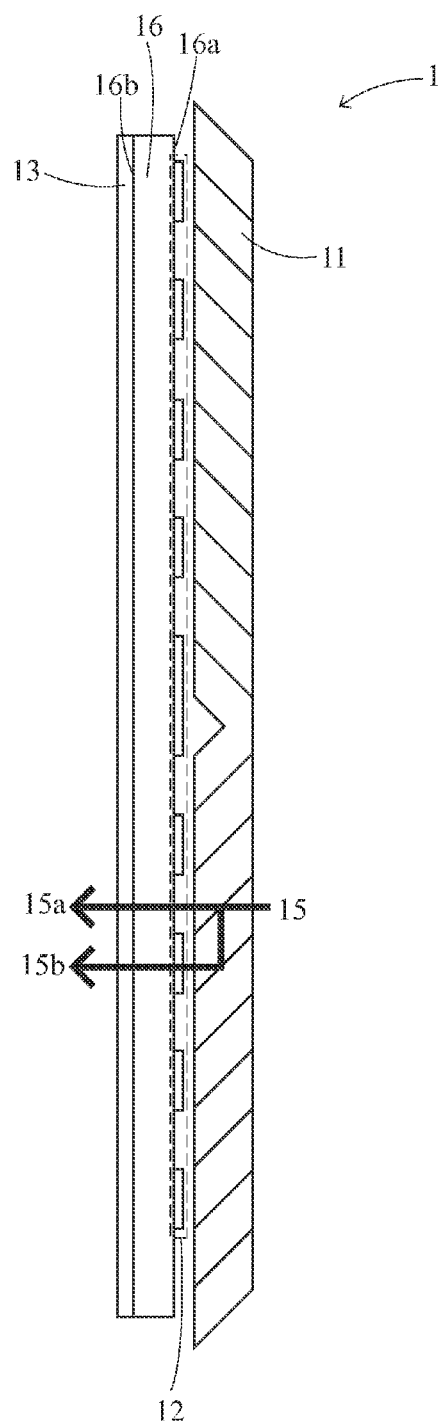
FIG. 1B is a schematic view of the polarization converter according to the first embodiment of the present invention in the second period.

With reference to FIGS. 1A and 1B, FIG. 1A is a schematic view of a polarization converter according to the first embodiment of the present invention in a first period. FIG. 1B is a schematic view of the polarization converter according to the first embodiment of the present invention in the second period. The polarization converter 1 comprises a polarizing beam splitter 11, a half wavelength retarder 12, a quarter wavelength retarder 13 and a glass 16.

Figure 3:
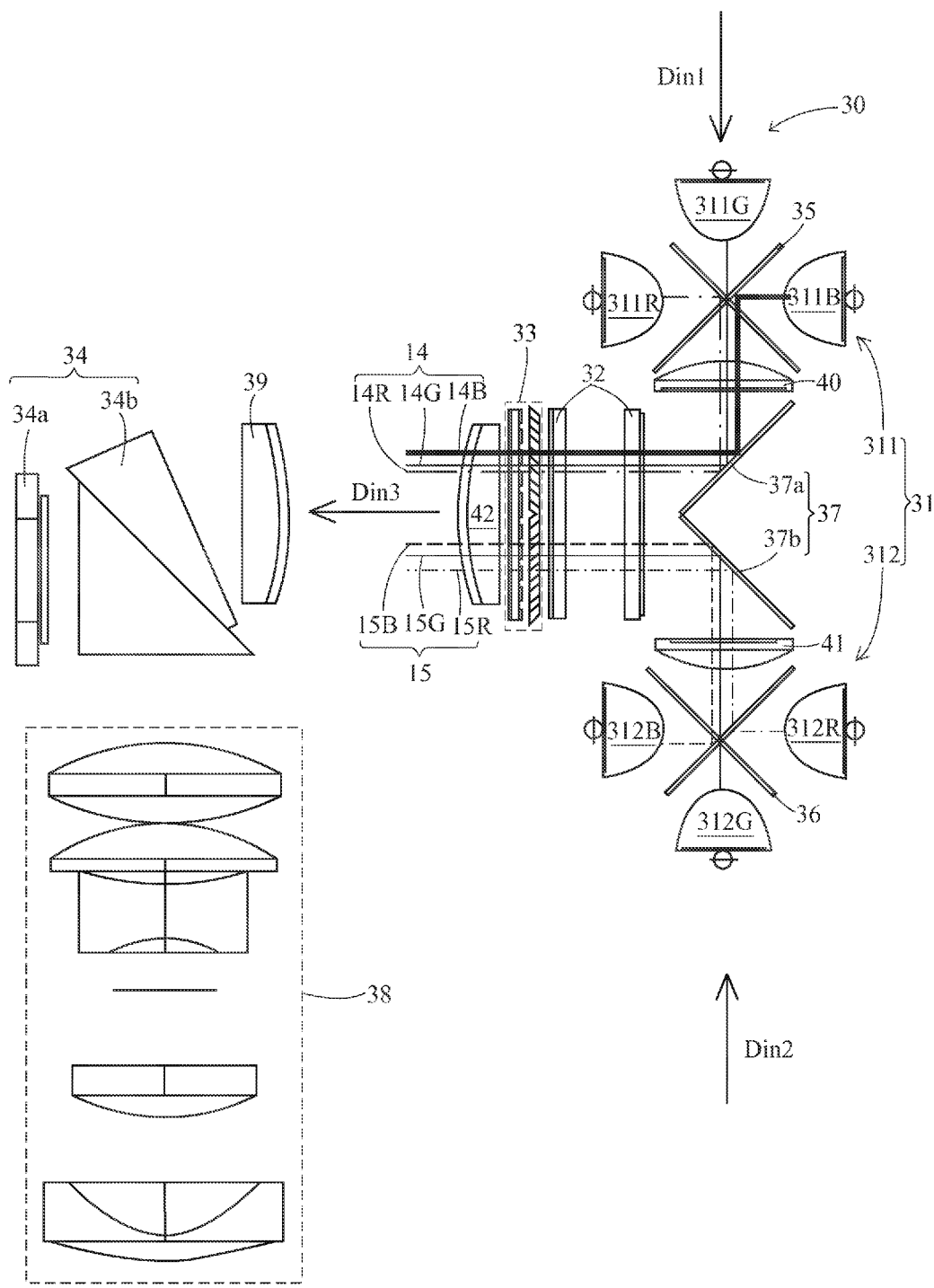
FIG. 3 is a schematic view of a projector apparatus according to the preferred embodiment of the present invention.

The half wavelength retarder 12 is attached on the first surface 16a of the glass 16 and disposed on the side of the polarizing beam splitter 11, and the quarter wavelength retarder 13 is disposed on the second surface 16b of the glass 16 opposite to the first surface 16a and is opposite to the half wavelength retarder 12. That is, the half wavelength retarder 12 is disposed between the quarter wavelength retarder 13 and the polarizing beam splitter 11. The polarization converter 1 can receive a first light 14 provided by a light module 31 (as shown in FIG. 3) in the first period and a second light 15 provided by the light module 31 in the second period. Furthermore, the light module 31 adopts a laser light source as a light source, so both the first light 14 and the second light 15 are a laser light.

As shown in FIG. 1A, the polarizing beam splitter 11 firstly splits the first light 14 into a first light beam 14a having a first polarized direction (i.e., an S polarized direction) and a second light beam 14b having a second polarized direction (i.e., a P polarized direction) in the first period.

Then, the half wavelength retarder 12 receives the first light beam 14a and the second light beam 14b, while the second light beam 14b is converted into the second light beam 14b having the first polarized direction by the half wavelength retarder 12. The first light beam 14a and the second light beam 14b having the first polarized direction are coupled to form a first polarized light having the first polarized direction, which passes through the first surface 16a and the second surface 16b of the glass 16 sequentially and exits from the second surface 16b.

Then, the quarter wavelength retarder 13 receives the first polarized light and converts the first polarized light into a first circularly polarized light (i.e., a right-circularly polarized light).

As shown in FIG. 1B, the polarizing beam splitter 11 further splits the second light 15 into a third light beam 15a having the second polarized direction and a fourth light beam 15b having the first polarized direction in the second period.

Then, the half wavelength retarder 12 receives the third light beam 15a and the fourth light beam 15b, while the fourth light beam 15b is converted into the fourth light beam 15b having the second polarized direction by the half wavelength retarder 12. The third light beam 15a and the fourth light beam 15b having the second polarized direction are coupled to form a second polarized light having the second polarized direction, which passes through the first surface 16a and the second surface 16b of the glass 16 sequentially and exits from the second surface 16b.

Then, the quarter wavelength retarder 13 receives the second polarized light and converts the second polarized light into a second circularly polarized light (i.e., a left-circularly polarized light).

In brief, as shown in FIGS. 1A and 1B, the first light 14 will be converted into the first circularly polarized light in the first period after entering the polarization converter 1; and the second light 15 will be converted into the second circularly polarized light in the second period after entering the polarization converter 1. Therefore, in the first embodiment, the polarization converter 1 is advantageous in that the first light beam 14a, the second light beam 14b, the third light beam 15a and the fourth light beam 15b that are split from the first light 14 and the second light 15 can be fully converted and utilized by the half wavelength retarder 12, thereby minimizing the brightness loss (i.e., improving the optical efficiency). It is worth noting that the image cross-talk problem and the ghosting effect from which the conventional stereoscopic displaying technologies have suffered can be effectively solved by means of the first circularly polarized light and the second circularly polarized light formed by the quarter wavelength retarder 13 in this embodiment.

Furthermore, when imaging occurs through polarized light splitting according to prior art, the conventional stereoscopic projection displaying system only captures light beams in a specific polarized direction (e.g., the S polarized direction or the P polarized direction) in respective periods, so light beams in the other polarized direction that are not captured are wasted and a loss of about 50% of the overall brightness is caused. However, the polarization converter according to the first embodiment of the present invention has indeed solved the aforesaid problem of brightness loss.

Figure 2:
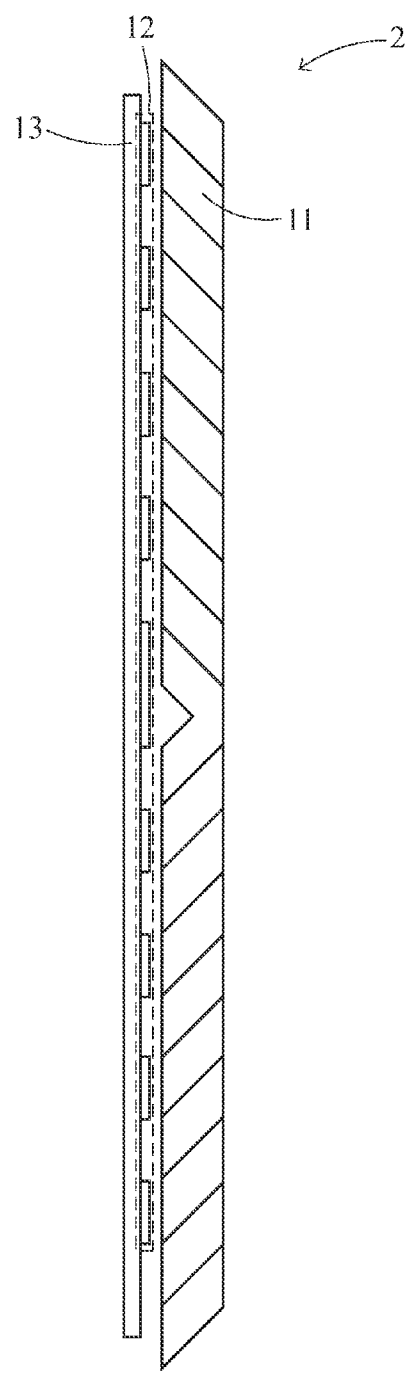
FIG. 2 is a schematic view of a polarization converter according to the second embodiment of the present invention.

FIG. 2 illustrates a schematic view of a polarization converter according to the second embodiment of the present invention. The second embodiment differs from the first embodiment in that the half wavelength retarder 12 of the second embodiment is directly attached onto the quarter wavelength retarder 13, and the polarization converter 2 is simplified in structure through the omission of the glass 16 in this embodiment. The relative relationships among and operations of other components have been described in the first embodiment, and thus will not be further described herein.

FIG. 3 illustrates a schematic view of a projector apparatus according to the preferred embodiment of the present invention. The projector apparatus 30 comprises a light module 31, a light uniformizing component 32, a polarization converter 33, an optical modulator 34, a first light combiner 35, a second light combiner 36, a reflector set 37, a lens set 38, a first light collector 39, a second light collector 40, a third light collector 41 and a fourth light collector 42.

In this embodiment, the light module 31 comprises a first emitting unit 311 and a second emitting unit 312 disposed in symmetry with the first emitting unit 311. The first emitting unit 311 has a first green light emitter 311G, a first blue light emitter 311B and a first red light emitter 311R adapted to emit the first light 14 (e.g., the first red light 14R, the first green light 14G or the first blue light 14B) in the first period; and the second emitting unit 312 has a second green light emitter 312G, a second blue light emitter 312B and a second red light emitter 312R adapted to emit the second light 15 (e.g., the second red light 15R, the second green light 15G or the second blue light 15B) in the second period. The light source of each of the aforesaid emitters may be selected from a light emitting diode (LED) and a laser diode (LD) for providing a laser light.

Furthermore, the aforesaid mode in which the first light 14 and the second light 15 are emitted respectively in different periods may be illustrated with reference to the following example: the first green light emitter 311G and the second green light emitter 312G can sequentially emit the first green light 14G and the second green light 15G in the first period and the second period respectively; the first red light emitter 311R and the second red light emitter 312R can sequentially emit the first red light 14R and the second red light 15R in a third period (which may be viewed as a first period of another cycle) and a fourth period (which may be viewed as a second period of the another cycle) respectively; and the first blue light emitter 311B and the second blue light emitter 312B can sequentially emit the first blue light 14B and the second blue light 15B in a fifth period (which may be viewed as the first period of a further cycle) and a sixth period (which may be viewed as the second period of the further cycle) respectively. Therefore, the colors of the first light 14 and the second light 15 can be rapidly switched according to different periods.

It shall be particularly appreciated that it is also possible to firstly emit the first blue light 14B and the second blue light 15B sequentially or firstly emit the first red light 14R and the second red light 15R sequentially in the first period and the second period; i.e., the sequence of the colored lights may be adjusted and changed. Therefore, the projector apparatus of this embodiment can accomplish the emission of lights of one color in any two adjacent periods (e.g., the first period and the second period, the third period and the fourth period, or the fifth period and the sixth period) in the aforesaid operation mode.

The first light combiner 35 is disposed adjacent to the first emitting unit 311 so that the first light 14 (e.g., the first red light 14R, the first green light 14G or the first blue light 14B) emitted from the first emitting unit 311 is guided toward the first incident direction Din1 and then passes through the second light collector 40. Similarly, the second light combiner 36 is disposed adjacent to the second emitting unit 312 so that the second light 15 (e.g., the second red light 15R, the second green light 15G or the second blue light 15B) emitted from the second emitting unit 312 is guided toward the second incident direction Dint and then passes through the third light collector 41. In this embodiment, both the first light combiner 35 and the second light combiner 36 are an X-plate, but are not limited thereto.

The reflector set 37 has a first reflecting mirror 37a and a second reflecting mirror 37b disposed adjacent to the first reflecting mirror 37a. The angle included between the first reflecting minor 37a and the second reflecting mirror 37b is 90 degrees. In this embodiment, the reflector set 37 is disposed between the first light combiner 35 and the second light combiner 36 to reflect the first light 14 traveling along the first incident direction Din1 and the second light 15 traveling along the second incident direction Din2, so that the reflected first light 14 and the reflected second light 15 project to the light uniformizing component 32, the polarization converter 33, the fourth light collector 42 and the first light collector 39 sequentially along the third incident direction Din3. It is worth noting that the angles of the first incident direction Din1, the second incident direction Dint and the third incident direction Din3 relative to the first reflecting mirror 37a and the second reflecting minor 37b are 45 degrees respectively.

The light uniformizing component 32 may be a lens array or a fly lens for uniformizing the first light 14 and the second light 15.

With reference to FIGS. 1A, 1B and 3, the optical path along which the first light 14 and the second light 15 projected to the polarization converter 33 in the third incident direction Din3 travel will be described more clearly.

Specifically, in the first period, the polarization converter 33 receives the uniformized first light 14 and converts the first light 14 into the first circularly polarized light. Then, the optical modulator 34 receives the first circularly polarized light, and projects the first circularly polarized light outwards through the fourth light collector 42, the first light collector 39, the optical modulator 34 and the lens set 38 sequentially and transforms the first circularly polarized light into the first view-angle image in the first period.

In the second period, the polarization converter 33 receives the uniformized second light 15 and converts the second light 15 into the second circularly polarized light. Then, the optical modulator 34 receives the second circularly polarized light, and projects the second circularly polarized light outwards through the fourth light collector 42, the first light collector 39, the optical modulator 34 and the lens set 38 sequentially and transforms the second circularly polarized light into the second view-angle image in the second period. In this preferred embodiment, the optical modulator 34 may comprise a digital micro mirror 34a or a liquid crystal display (LCD), and may further be used in combination with a triangular prism set 34b but is not limited thereto.

According to the above descriptions, the first light (e.g., the first red light 14R, the first green light 14G or the first blue light 14B) and the second light (e.g., the second red light 15R, the second green light 15G or the second blue light 15B) are alternately emitted by the light module of the projector apparatus of the present invention into the polarization converter according to a time sequence, and then sequentially converted by the polarization converter into a first red circularly polarized light, a second red circularly polarized light, a first green circularly polarized light, a second green circularly polarized light, a first blue circularly polarized light and a second blue circularly polarized light. Then, all the first circularly polarized lights can be converted by the optical modulator and the lens set into a first view-angle image (i.e., a left-eye image) and all the second circularly polarized lights can be converted by the optical modulator and the lens set into a second view-angle image (i.e., a right-eye image). Thereby, a stereoscopic image with complete color information (the three primary colors of light) can be using a pair of passive glasses that is simple and cheap in price. Furthermore, by means of the polarization converter, the present invention effectively decreases the complexity of the optical module, reduces the cost of the projector apparatus, facilitates the miniaturization of the projector apparatus and improves the optical efficiency (i.e., reduces the optical loss or sacrifice). Furthermore, the projector apparatus of the present invention can indeed eliminate the image cross-talk problem with the conventional stereoscopic displaying technologies.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A polarization converter for use in a projector apparatus, the polarization converter comprising:
   a polarizing beam splitter for splitting a first light into a first light beam having a first polarized direction and a second light beam having a second polarized direction;
   a half wavelength retarder disposed on a side of the polarizing beam splitter for receiving the second light beam, the second light beam having the second polarized direction being converted into the second light beam having the first polarized direction by the half wavelength retarder, and the first light beam and the second light beam having the first polarized direction being coupled to form a first polarized light having the first polarized direction; and
   a quarter wavelength retarder disposed behind the half wavelength retarder for receiving the first polarized light and converting the first polarized light into a first circularly polarized light;
   wherein the polarizing beam splitter splits a second light into a third light beam having the second polarized direction and a fourth light beam having the first polarized direction, and the half wavelength retarder receives the fourth light beam, the fourth light beam having the first polarized direction is converted into the fourth light beam having the second polarized direction by the half wavelength retarder, and the third light beam and the fourth light beam having the second polarized direction are coupled to form a second polarized light having the second polarized direction, and the quarter wavelength retarder receives the second polarized light and converts the second polarized light into a second circularly polarized light.

2. The polarization converter of claim 1, wherein the half wavelength retarder is disposed between the quarter wavelength retarder and the polarizing beam splitter.

3. The polarization converter of claim 1, wherein the half wavelength retarder is disposed on a first surface of a glass.

4. The polarization converter of claim 3, wherein the quarter wavelength retarder is disposed on a second surface of the glass opposite to the first surface, and the quarter wavelength retarder is opposite to the half wavelength retarder.

5. The polarization converter of claim 1, wherein the half wavelength retarder is attached to the quarter wavelength retarder.

6. A projector apparatus comprising:
   a light module for providing a first light in a first period and providing a second light in a second period;
   a light uniformizing component for uniformizing the first light and the second light;
   a polarization converter according to claim 1 for receiving the uniformized first light and the uniformized second light, and respectively converting the first light and the second light into the first circularly polarized light and the second circularly polarized light; and
   an optical modulator for receiving the first circularly polarized light and the second circularly polarized light, and transforming the first circularly polarized light into a first view-angle image in the first period and transforming the second circularly polarized light into a second view-angle image in the second period.

7. The projector apparatus of claim 6, wherein the light uniformizing component is a lens array or a fly lens.

8. The projector apparatus of claim 6, wherein the optical modulator is a digital micro minor or a liquid crystal display.

9. The projector apparatus of claim 6, wherein the light module comprises:
   a first emitting unit for emitting the first light in the first period, the first emitting unit comprising a first green light emitter, a first blue light emitter and a first red light emitter; and
   a second emitting unit disposed in symmetry with the first emitting unit for emitting the second light in the second period, the second emitting unit comprising a second green light emitter, a second blue light emitter and a second red light emitter.

10. The projector apparatus of claim 9, further comprising:
    a first light combiner disposed adjacent to the first emitting unit for driving the first light emitted from the first emitting unit to travel toward a first incident direction; and
    a second light combiner disposed adjacent to the second emitting unit for driving the second light emitted from the second emitting unit to travel toward a second incident direction.

11. The projector apparatus of claim 10, wherein the first light combiner is an X-plate.

12. The projector apparatus of claim 10, further comprising:
    a reflector set disposed between the first light combiner and the second light combiner for reflecting the first light traveling along the first incident direction and the second light traveling along the second incident direction, so that the reflected first light and the reflected second light project to the polarization converter along a third incident direction.

13. The projector apparatus of claim 12, wherein the reflector set comprises a first reflecting mirror and a second reflecting minor disposed adjacent to the first reflecting mirror, and an angle included between the first reflecting mirror and the second reflecting mirror is 90 degrees.

14. The projector apparatus of claim 13, wherein angles of the first incident direction, the second incident direction and the third incident direction relative to the first reflecting mirror and the second reflecting mirror are each 45 degrees.

* * * * *